United States Patent [19]

Storz

[11] 4,062,095

[45] Dec. 13, 1977

[54] AUTOMATIC WIRE FEEDER

[76] Inventor: Edwin L. Storz, 7527 Woodland Ave., St. Louis, Mo. 63143

[21] Appl. No.: 711,406

[22] Filed: Aug. 3, 1976

[51] Int. Cl.² ............................................. B23P 19/04
[52] U.S. Cl. ...................................... 29/802; 29/809; 29/281.5; 198/492; 214/1 PB; 221/298; 157/1.5
[58] Field of Search ............. 29/208 R, 159.02, 200 J, 29/200 P, 208 F, 211 R, 802, 809, 281.1, 281.5; 198/492; 221/298; 214/1 PB, 8.5 A, 8.5 K; 228/4.1; 227/114, 115, 116; 157/1.5

[56] References Cited

U.S. PATENT DOCUMENTS

| | | | |
|---|---|---|---|
| 2,870,937 | 1/1959 | Telly | 221/298 X |
| 2,993,623 | 7/1961 | Bendot | 221/298 |
| 3,304,499 | 2/1967 | Vincze | 221/298 X |
| 3,432,076 | 3/1969 | Arsenault | 214/1 PB X |
| 3,631,577 | 1/1972 | Hasegawa | 29/211 R |
| 3,636,614 | 1/1972 | Damman et al. | 29/211 R |
| 3,774,779 | 11/1973 | White | 214/1 PB X |
| 3,840,965 | 10/1974 | Meiklejohn | 29/208 D |

*Primary Examiner*—Victor A. DiPalma
*Attorney, Agent, or Firm*—Grace J. Fishel

[57] ABSTRACT

An automatic wire feeder for feeding pieces of wire in an assembly operation. More particularly, an automatic wire feeder for feeding pieces of wire in a radial assembly operation wherein the automatic wire feeder drops the wires, one by one, in a wire loading device having means for holding the wires in assembled condition.

10 Claims, 10 Drawing Figures

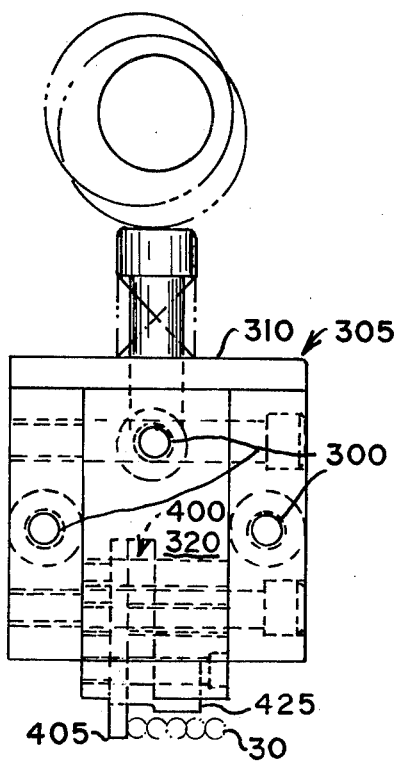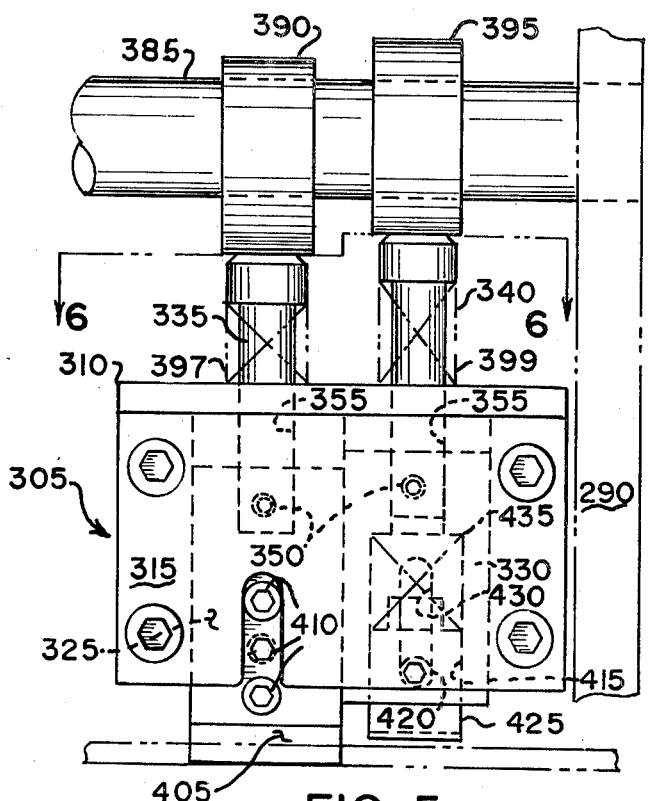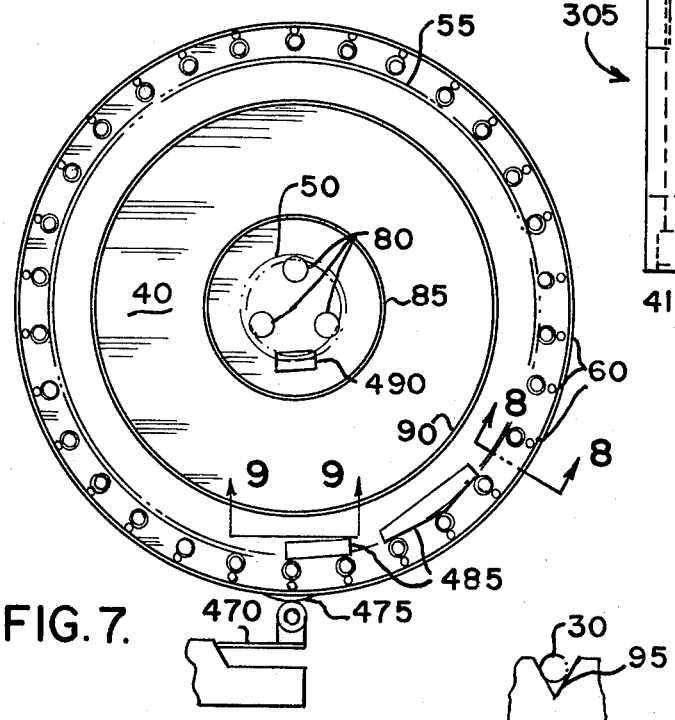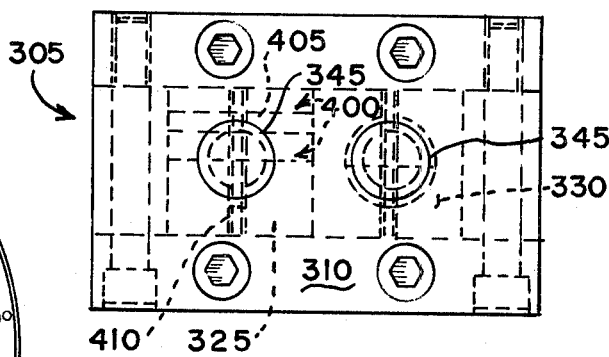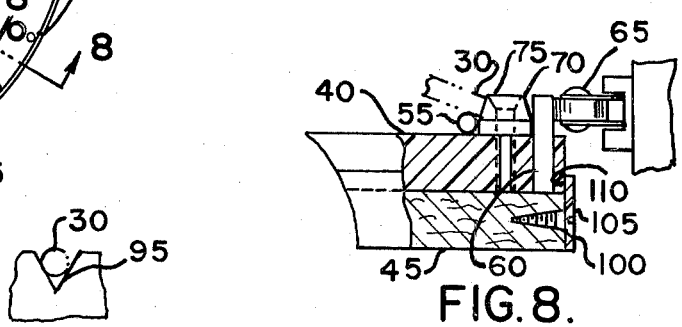

AUTOMATIC WIRE FEEDER

This invention relates to an automatic wire feeder and to a wire loading device for use therewith.

In the past, wire wheel covers of the type comprising a hub, a rim surrounding the hub and a series of radial wires interconnecting the hub and the rim have been assembled by hand. These hand operations have contributed greatly to the costs of such covers. Other wire products such as barbecue grills, are similarly fabricated.

Sometimes, as in the case of wire wheel covers, it is desirable that the wires connecting the hub and the rim be at an inclination. Other times, as with grills, it is desirable that the wires be horizontal or only slightly inclined. Any machine, therefore, which replaces the hand operation should be readily adaptable to these different assembly requirements.

In view of the above, among the primary objects of the present invention is the provision of a machine for automatically feeding and loading wires in the assembly of wheel covers, barbecue grills or the like. Another object is to provide a machine which can accomplish such assembly with precision and rapidity not possible in hand operations. Still another object is to provide a machine which reduces the costs in making such products. Yet another object is to provide a machine which is readily adjustable for the assembly of many different wire products. Other objects and features will be in part apparent and in part pointed out hereinafter.

The invention accordingly comprises the constructions hereinafter described, the scope of the invention being indicated in the subjoined claims.

In the accompanying drawings, in which one of various possible embodiments of the invention is illustrated, corresponding reference characters indicate corresponding parts throughout the several views of the following drawings:

FIG. 4 is a side elevational view of the mechanical fingers and cams for automatically holding and feeding wire segments;

FIG. 5 is a front elevational view of the fingers and cams shown in FIG. 4;

FIG. 6 is a top plan view of the fingers and cams shown in FIG. 4;

FIG. 7 is a top plan view of the rotating turntable and fixture;

FIG. 8 is a sectional view taken along line 8—8 in FIG. 7;

FIG. 9 is a detail of a typical notch in one of the guide rings on the fixture; and, FIG. 10 is a front elevational view of the automatic wire feeder and loader as viewed in FIG. 2 but with the wire loading device level.

Figure 1:
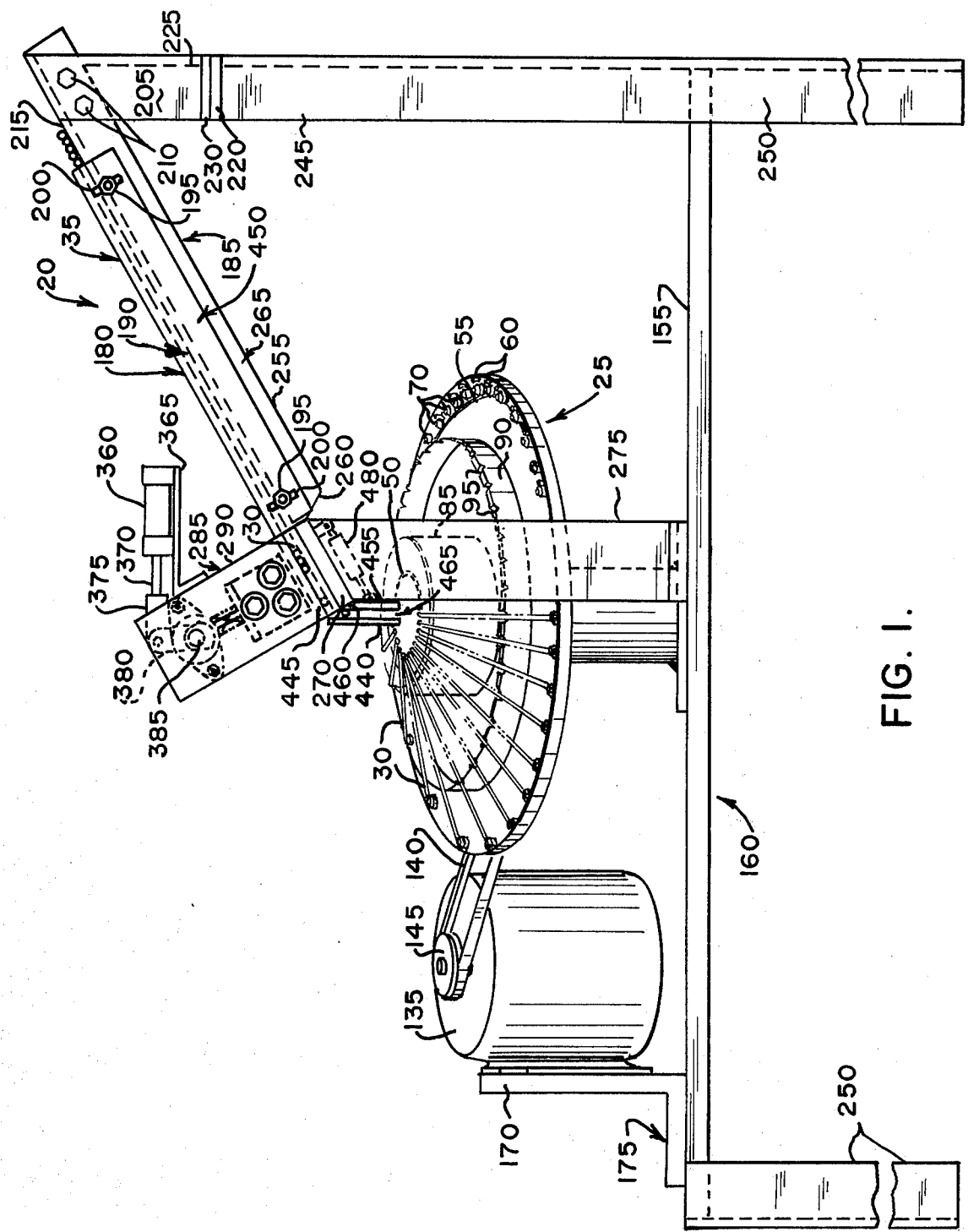
FIG. 1 is a side elevational view of an automatic wire feeder and wire loading device according to the present invention.

In the drawings, reference numeral 20 designates an automatic wire feeder and numeral 25 a wire loading device for use therewith. Wires 30 are rolled down two parallel rails 35 of feeder 20 into a fixture 40 mounted on a turntable 45 of loader 25.

Figure 2:
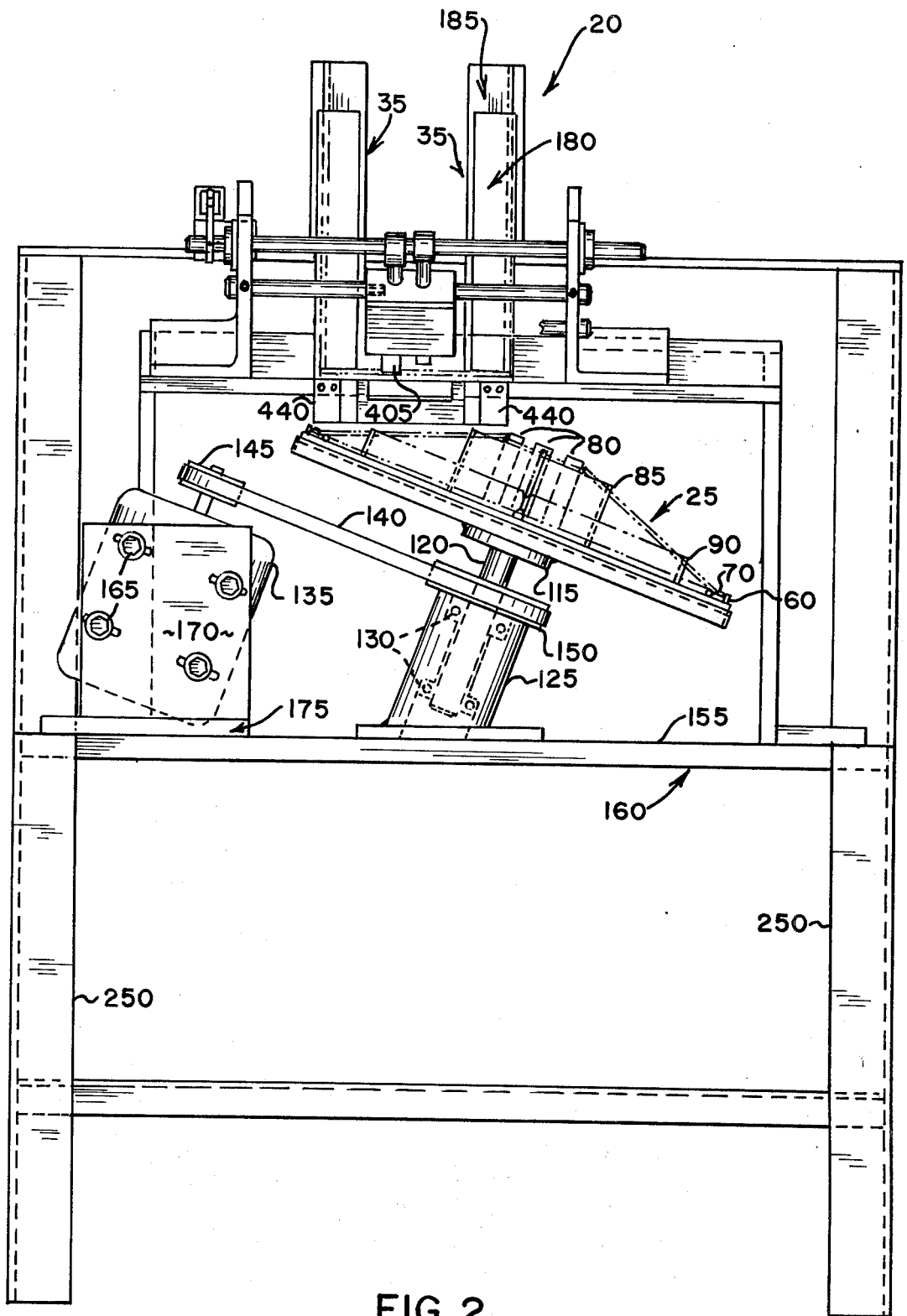
FIG. 2 is a front elevational view of the device shown in FIG. 1.
Figure 3:
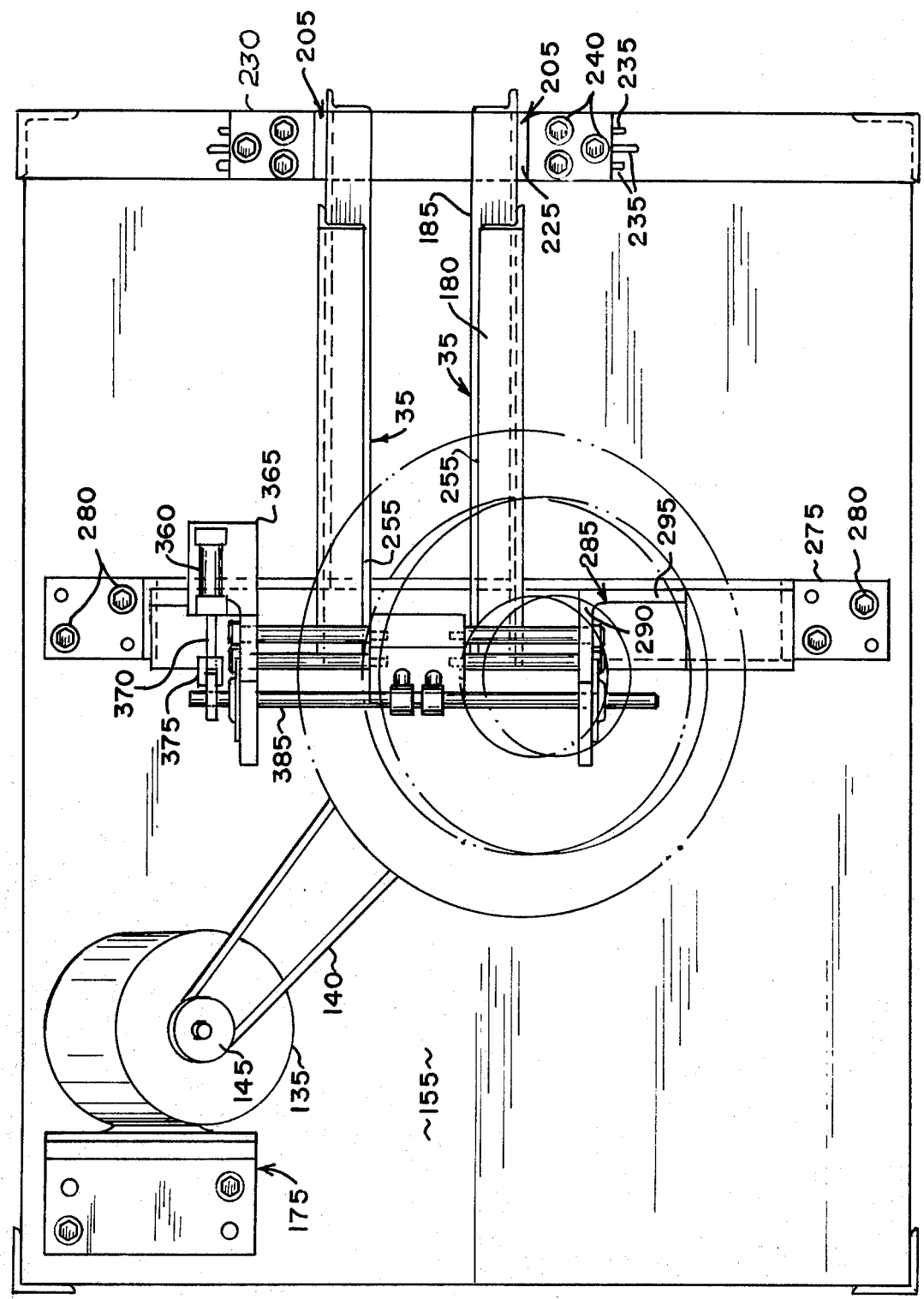
FIG. 3 is a top plan view of the device shown in FIG. 1.

As best seen in FIGS. 1 and 2, turntable 45 is at an angle to horizontal. So positioned, loader 25 is useful in the assembly of wire wheel covers wherein the wires are inclined at an angle. Parts for manufacturing such wheel covers are loaded on fixture 40, as more particularly described below, and include a hub 50, a rim 55 surrounding hub 50 and a plurality of wires 30 extending radially from the hub. As shown in FIG. 9, wires 30 are round in cross-section and, as shown in FIGS. 1 and 2, they are long enough to interconnect hub 50 with rim 55 without substantial overhang.

Fixture 40 is formed from a circular disc of Bakelite plastic or the like. A plurality of upstanding studs 60 are symmetrically positioned around the periphery of fixture 40 for use in cooperation with switch 65 as shown in FIG. 8. Spaced radially inwardly from studs 60 are an equal number of locator buttons 70. Buttons 70 are secured to fixture 40 by screws 75 or other suitable fasteners.

Three upstanding pins 80 are symmetrically positioned about the center of fixture 40. An outwardly facing notch (not shown) is provided adjacent the upper end of each pin 80 for cooperative receipt of hub 50. Hub 50 is thus supported by pins 80 and elevated from the plane of fixture 40. The notch in pins 80 although shown facing outwardly, preferably faces inwardly, particularly when hubs 50 are irregular in shape.

Spaced radially intermediate buttons 70 and pins 80 are two guide rings 85 and 90. Inner and outer rings 85 and 90, respectively, have a plurality of symmetrically spaced, upwardly facing, V-shaped notches 95, a typical one of which is shown in FIG. 9. The number of notches in each ring 85 and 90 is equal to the number of buttons 70 around the periphery of fixture 40 for the purpose described below.

As seen in FIGS. 1 and 2, rings 85 and 90 are positioned so that notches 95 line up with buttons 70. Inner ring 85 is thicker than outer ring 90 so that aligned pairs of notches 95 provide inclined channels for receipt of wire segments 30 while buttons 70 provide end stops for retaining the wires in said channels. The thickness of rings 85 and 90 is selected so that opposite ends of each wire 30 rest upon the upper edge of hub 50 and rim 55 while intermediate portions are seated in notches 95 as shown.

Fixture 40 is mounted on circular turntable 45. To this end, as shown, a band 100 is secured around the edge of turntable 45 by screws 105 or other suitable fasteners. Band 100 is wider than turntable 45 is thick so that the band forms a circular recess 110 for receipt of fixture 40.

Opposite recess 110, turntable 45 is connected by a flange 115 for rotation about its center on a shaft 120. Shaft 120 is journaled in a support 125 on bearings 130 and is rotated by motor 135. Motor 135 is connected to shaft 120 by an ordinary V-belt 140 and pulleys 145 and 150.

Support 125 is centrally secured to an upper surface 155 of a table 160. Motor 135 is bolted at 165 to an upright portion 170 of an L-shaped bracket 175 also secured to table 160. As best seen in FIG. 2, support 125 makes an angle to table 160 which is the complement of the angle that wires 30 make to fixture 40. Thus, when wires 30 are dropped by feeder 20 as more particularly described below, they fall horizontally into aligned notches 95.

Referring now to automatic wire feeder 20 as shown in FIGS. 1-6 and 10, each of rails 35 is formed from two nested sections of angle iron 180 and 185, upper and lower sections, respectively. Angle irons 180 and 185 are spaced apart as described below and provide channels 190. Channels 190 support the ends of wires 30 and provide a surface down which they roll.

As best seen in FIG. 1, bolts 195 join upper and lower angle irons 180 and 185. Slots 200 are provided adjacent opposite ends of upper angle irons 180. Using bolts 195 and slots 200, the spacing between angle irons 180 and 185 is adjustable to accommodate the diameter of the particular wires 30 being fed by feeder 20.

Rails 35 are attached to L-shaped brackets 205 by bolts 210 at upper ends 215 of lower angle irons 185. Brackets 205 are mounted on cross member 220 with spines 225 opposing and toes 230 facing away. Elongated slots 235 are provided in toes 230. Bolts 240 cooperate with slots 235 so that brackets 205 are adjustable towards and away from each other. By this adjustment, the spacing between rails 35 may be adapted for use with different lengths of wires.

Cross member 220 is supported at its opposite ends by upstanding frame member 245 which are attached to table 160 at opposite corners, along one edge. As shown, frame members 245 are formed as extensions of legs 250 supporting the table.

Lower ends 255 of lower angle irons 185 have cut outs 260 in skirts 265 thereof. So cut away, lower ends 255 rest flat on a cross member 270.

Cross member 270 is formed from a elongated strip which is inclined at the same angle as rail 35. Opposite ends of cross member 270 are attached to upstanding frame members 275. Frame members 275 are attached to table 160 by bolts 280 and are positioned so that as wires 30 fall from lower ends 255 of angle irons 185, they drop onto wire loading device 25 as described below.

Two L-shaped brackets 285 are mounted on cross member 270 with spines 290 opposing and toes 295 facing away. Suspended between brackets 285 on shoulder bolts 300 is a wire holding device 305. Wire holding device 305 is centered on shoulder bolts 300 between rails 35. When rails 35 are moved further apart or closer together as described above, compensating changes may be made in the position of device 305. These may be necessary when wires 30 have a head or the like.

Wire holding device 305 includes a top plate 310, side plates 315 and end plates 320. Fitted within device 305 are two reciprocating members 325 and 330, best seen in FIGS. 4-6.

Members 325 and 330 are reciprocatably driven by cam followers 335 and 340 which pass through apertures 345 in top plate 310 provided therefor. Cam followers 335 and 340 are seated by set screws 350 into recesses 355 in members 325 and 330.

As viewed in the figures, a cylinder 360 is mounted on a bracket 365 to right bracket 285 supporting wire holding device 305. Cylinder 360 reciprocates a push rod 370 which is connected by a clevis 375 through a connecting link 380 to a cam shaft 385. Keyed to cam shaft 385 are cams 390 and 395 by which cam followers 335 and 340 are respectively driven. When push rod 370 is retracted, cam follower 335 pushes member 325 downwardly while cam follower 340 raises member 330. When push rod 370 is extended, member 325 is up while member 330 is down. Springs 397 and 399 are provided between cam followers 335 and 340 and top plate 310 so that members 325 and 330 are resiliently biased and not rigidly held, when they are depressed by their respective cam followers.

A slot 400 is provided in the bottom surface of reciprocating member 325, opposite recess 355 and generally parallel to side plates 315. A blade 405 is mounted in slot 400 by opposing screws 410. By adjusting screws 410, blade 405 can be selectively positioned within slot 400 to accommodate different diameters of wire 30 as described below.

A recess 415 is provided in the bottom surface of reciprocating member 330, opposite recess 355. Mounted on a pin 420 is a cylindrically shaped foot 425. Opposite ends of pin 420 are supported in elongated cut outs 430 which communicate with recess 415 and permit foot 425 to reciprocate within the recess. Foot 425 is spring biased at 435 to accommodate different diameters of wire as described below.

In use, at the beginning of a feeding cycle, blade 405 is adjusted in slot 400 by screws 410 so that foot 425 presses several wires 30 adjacent the endmost wire without contacting that wire. Once blade 405 is positioned in slot 400, wire holding device 305 is adjusted so that the forward end of blade 405 abuts cross member 270. When blade 405 is down, foot 425 is up and blade 405 forms a stop preventing wires 30 from falling out of feeder 25.

As mentioned above, the distance between rails 35 is adjustable by loosening bolts 210 and sliding brackets 205 along slots 235. Once rails 35 are positioned so that channels 190 support wires 30, wire holding device 305 is centered therebetween by shoulder bolts 300. A plurality of wires 30 are then loaded on rails 35. Wires 30 roll side by side down th rails until they are stopped by blade 405.

Turntable 45 is positioned under ends 255 of lower angle iron 185. A pair of guides 440 depend from end 445 of upper angle iron 180. Like lower angle iron 185, skirts 450 of angle iron 180 are cut away to clear cross member 270.

A plate 455 is hinged at 460 to cross member 270 and forms an inner guide for use in cooperation with outer guides 440. As best seen in FIG. 1, wire 30 when released by blade 405 falls from end 255 into a slot 465 formed between guides 440 and plate 455. Wire 30 is thus directed towards wire loading device 25 positioned therebelow.

Fixture 40 is positioned on turntable 45 so that one pair of aligned notches 95 are directly below slot 465. When wire 30 falls from feeder 25, it is thus directed towards and is received in notches 95. Opposite ends of wire 30 rest on hub 50 and rim 55, with the lower end abutted against button 70.

After wires 30 have been loaded on rails 35, turntable 45 is positioned so that a switch 470 is stopped on a camming surface 475. A pushbutton switch (not shown) is depressed to actuate motor 135. Motor 135 rotates turntable 45 until the first set of aligned notches 95 is located beneath slot 465. When aligned notches 95 reach slot 465, switch 65 is tripped by stud 60. As switch 65 is tripped, motor 135 is stopped and cylinder 360 is activated.

Cylinder 360 reciprocates pushrod 370 as described above and causes a single wire 30 to be dropped from feeder 20 into aligned notches 95 of wire loading device 25. Motor 135 is then again activated and turntable 45 rotated until switch 65 is again tripped. Cylinder 360 is reciprocated and so forth until turntable 45 has made a complete rotation and each of aligned notches 95 has been filled with a wire segment.

When turntable 45 completes one rotation, switch 470 is tripped on camming surface 475. As switch 470 is tripped, a cylinder 480 is activated to displace plate 455 backwardly and upwardly on hinges 460 away from turntable 45.

With plate 455 swung away, fixture 40 is removed from turntable 45. At a separate work station (not shown), opposite ends of wires 30 are welded where they touch hub 50 and rim 55. To facilitate this operation, apertures 485 are provided radially inwardly and adjacent locator buttons 70 so that contact points of wires 30 with rim 55 can be readily reached by a welding probe from beneath fixture 40. Similarly, apertures 490 are provided radially outwardly and adjacent pins 80 so that wires 30 are easily reached for welding to hub 50.

In view of the above, it will be seen that the several objects of the invention are achieved and other advantageous results attained. For example, it is seen that switches 65 and 470 may be connected by appropriate circuitry to timing relays or the like so that motor 135 operates and cylinders 360 and 480 function automatically once the start switch has been activated. The machine also stops automatically. Thus fixture 40 is automatically loaded with wire segments 30 rapidly and more accurately than is possible if the loading is done by hand.

As various changes could be made in the above constructions without departing from the scope of the invention, it is intended that all matter contained in the above description or shown in the accompanying drawings shall be interpreted as illustrative and not in a limiting sense. For example, if wires 30 are to be loaded on fixture 40 at some other angle, the angle that support 125 makes to table 160 is adjusted. At the same time, corresponding adjustments are made in the relative thickness of guide rings 85 and 90 so that the channel provided by aligned notches 95, as described above, is at the complementary angle of that angle which support 125 makes to table 160. So done, selected aligned notches 95 may, one by one, be presented under slot 465.

Figure 10:
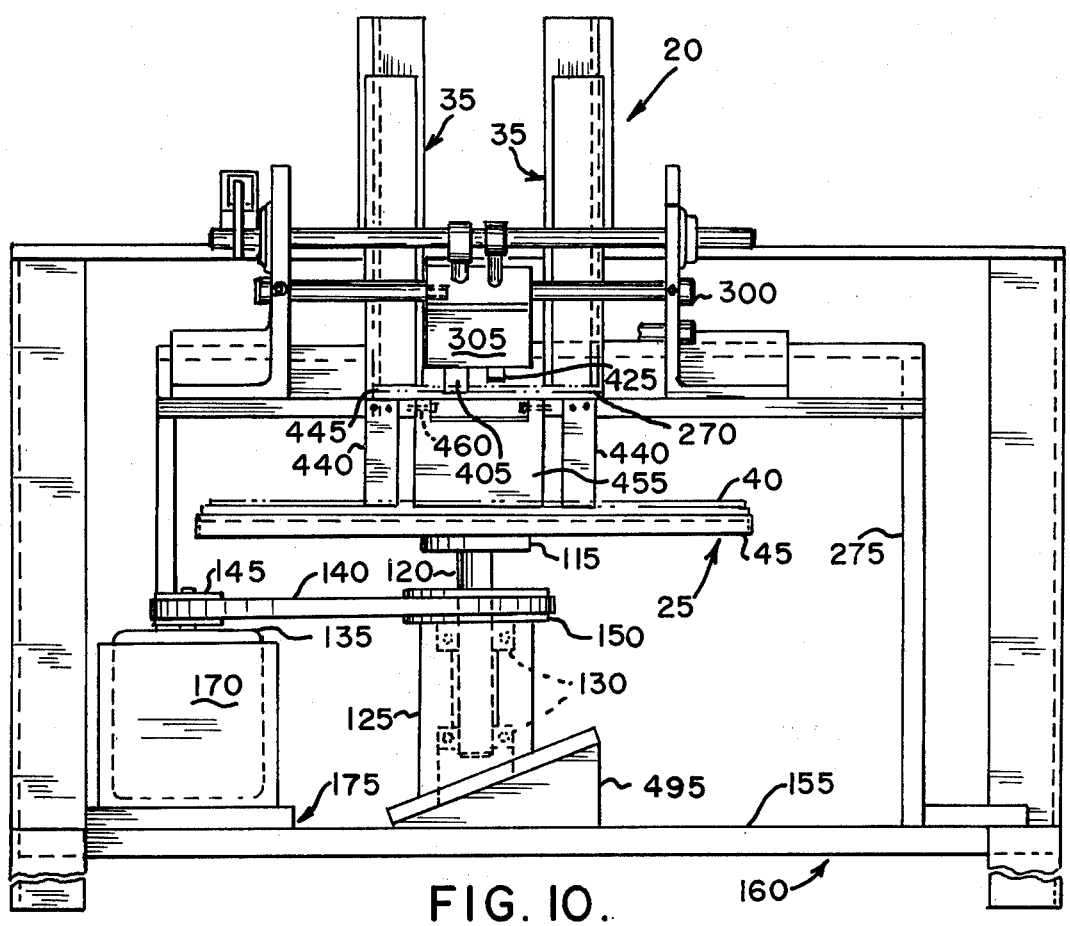

The above-mentioned adjustment is illustrated in FIG. 10 wherein support 125 is at 90 degrees to table 160 when wires 30 are loaded horizontally on fixture 40. This arrangement is used, for example, in making barbecue grills or the like. Support 125 is shown as elevated by wedge 495, however, other adjustment means for this purpose are, of course, useful.

What is claimed is:

1. Apparatus for use in manufacturing a wire product, said apparatus including a wire feeder, said feeder including an inclined surface down which the wires to be fed roll, a wire holding device having first and second spring biased members alternatively reciprocated by a cam and serving as stops for the wire at the lower end of the inclined surface, said first and second members being in side-by-side relationship, said second reciprocating member including a flat foot for pressing several wires adjacent the endmost wire against the inclined surface, said first reciprocating member including a blade longitudinally adjustable with respect to the foot for selectively spacing said blade down the inclined surface from said foot less than two diameters of the wire being fed such that when the foot is pressed against the wires adjacent the endmost wire the blade permits only a single wire to roll from the lower end of the inclined surface, said flat foot being oppositely spring biased with respect to the bias of the second reciprocating member.

2. The apparatus according to claim 1 wherein the blade is supported in a slot provided therefor in the first reciprocating member, said slot being wider than the blade is thick.

3. The apparatus according to claim 2 wherein the spring biased flat foot is supported on a pin, opposite ends of which are reciprocated in elongated cutouts provided therefor in the second reciprocating member.

4. The apparatus according to claim 3 wherein the inclined surface is formed from two parallel rails, joined at their lower ends by a cross member inclined at the same angle as the rails and across which the wires roll.

5. The apparatus according to claim 4 wherein each rail has a channel down which the wires roll.

6. The apparatus according to claim 5 wherein a pair of downwardly depending guides are provided at the lower end of the rails, said guides forming a slot through which the wires fall as they are released by the blade.

7. Apparatus for use in manufacturing a wire product, said apparatus including a wire feeder and a wire loader, said feeder including an inclined surface down which the wires to be fed roll, first and second reciprocating members alternatively serving as stops for the wires at the lower end of the inclined surface, said first reciprocating member spaced down the inclined surface from said second reciprocating member, said space being substantially less than two diameters of the wire being fed such that when said second reciprocating member is serving as a stop, said first reciprocating member permits only a single wire to roll from the lower end of the inclined surface, said wire loader including a fixture having concentricly positioning means for a hub surrounded by a rim, first and second guide rings located on the fixture between the hub and the rim adapted for receipt of a wire falling from the lower end of the inclined surface of the wire feeder.

8. The apparatus according to claim 7 wherein the positioning means for the hub supports the hub elevated from the plane of the fixture and the positioning means for the rim supports the rim in the plane of the fixture.

9. The apparatus according to claim 8 wherein the first and second guide rings are concentric with the hub, said second guide ring spaced radially inwardly of the first guide ring, said second guide ring wider than the first guide ring, both guide rings having notches adapted for receipt of the wires, selected ones of the notches being in radial alignment for receipt of the wire segments with opposite ends of the wires supported by the hub and the rim.

10. The apparatus according to claim 9 which further includes end stops adjacent the positioning means for the rim to retain the wires received in said aligned notches.

* * * * *